United States Patent [19]

Collins et al.

[11] Patent Number: 4,879,635
[45] Date of Patent: Nov. 7, 1989

[54] MOUNTING CHASSIS FOR A GRAPHICS FUNCTION CONTROL UNIT

[75] Inventors: Robert T. Collins, Bedford, Mass.; John D. Quinn, Hudson, N.H.; Stephen A. Fidrych, Boxboro, Mass.

[73] Assignee: Digital Equipment Corporation, Maynard, Mass.

[21] Appl. No.: 83,655

[22] Filed: Aug. 7, 1987

[51] Int. Cl.$^4$ .............................................. H05K 7/14
[52] U.S. Cl. .................................... 361/391; 248/917; 358/248; 340/700
[58] Field of Search .......................... 361/331–334, 361/356, 380–384, 390, 391 X, 393, 395, 399, 422, 423; 312/223; 248/1 A X; 358/248 X; 340/700 X; 313/482

[56] References Cited

U.S. PATENT DOCUMENTS

| | | | |
|---|---|---|---|
| 4,388,671 | 6/1983 | Hall | 361/391 |
| 4,734,874 | 3/1988 | Hwang | 361/391 |
| 4,739,445 | 4/1988 | Tragen | 361/391 |

OTHER PUBLICATIONS

Computer Buyer's Guide and Handbook Published by Computer Information Publichg. Inc., New York, NY, vol. III, Issue 5, Guide #23, Sep. 1985, pp. 1–90.

Primary Examiner—Gerald P. Tolin
Attorney, Agent, or Firm—Kenyon & Kenyon

[57] ABSTRACT

A mounting for the electronic components of computer system's functional control unit comprises a housing for supporting a display unit and for enclosing an electronics chassis comprising electronics to control access to a variety of peripheral units. The electronics chassis is removably mounted within the housing on slide rails so as to be removed, serviced or replaced without having to lift the terminal off the housing of the functional control unit. The mounting thus simplifies the installation and maintenance procedures for computer systems.

3 Claims, 2 Drawing Sheets

4,879,635

MOUNTING CHASSIS FOR A GRAPHICS FUNCTION CONTROL UNIT

BACKGROUND OF THE INVENTION

The present invention relates to a chassis for mounting electronics in a functional control unit for a computer system in which the display terminal therefor is mounted to the chassis, wherein electronics that comprise the functional control unit are removably mounted so as to be serviced independent of the display terminal.

A display terminal is frequently mounted on the functional control units of a personal computer to form pedestal-type computer system. In a graphics workstation computer system, a graphics display terminal, such as the VR290 color graphics terminals sold by Digital Equipment Corporation, is typically mounted to a graphics functional control unit to form a pedestal-type workstation computer system. In a graphics workstation, the graphics functional control unit controls access to a control computer by the terminal and a variety of peripheral units that typically are interfaced to the workstation.

When the terminal is mounted to the functional control unit, whether the unit is the control computer (as in a personal computer system) or the graphics functional control unit (as in a workstation), a housing at least partially encloses the electronics for the functional control unit. The housing has an access panel on its bottom side to give access to the electronics mounted inside. Maintenance and testing of the functional control electronics thus requires that a service technician flip over the computer system and open the access panel. Frequently, the terminal is removably mounted to the functional control unit so that the service technician would first remove the terminal from the top of the housing, then flip over the functional control unit, and then open the access panel.

The acts of flipping the control unit over and detaching and removing the terminal from the housing can result in increased risk of damages to the computer system. Further, display terminals, such as the VR290, typically weigh more than the maximum weight that one service technician can lift under current OSHA regulations. The testing, servicing and replacement of a graphics function control unit requires only one technician. Removing the graphics display terminal from the graphics function control unit, however, requires an additional technician. The need to have a second technician present to service a workstation is expensive and complicates the process of scheduling maintenance calls.

SUMMARY OF THE INVENTION

The present invention relates to a removable electronics chassis for a functional control unit that permits removing the functional control electronics from its housing without the need to lift the terminal affixed to the unit off the housing and flip over the control unit. In the preferred embodiment of the present invention, the electronics are contained in a metal electronics chassis that is slidably suspended within a plastic housing. The terminal is connected to the electronics chassis in the same way used to connect the terminal to current functional control units. However, the present invention permits a service technician to disconnect the connection cable and remove the electronics chassis by sliding it out of the back of the housing. The terminal remains positioned atop the housing. The mounting of the electronics chassis therefore requires only one technician to test, service or remove the electronics from the functional control unit. The present invention has particular utility for mounting the functional control unit of a high resolution color graphics display terminal because these terminals are particularly heavy.

DETAILED DESCRIPTION OF THE PREFERRED EMBODIMENT

Figure 1:
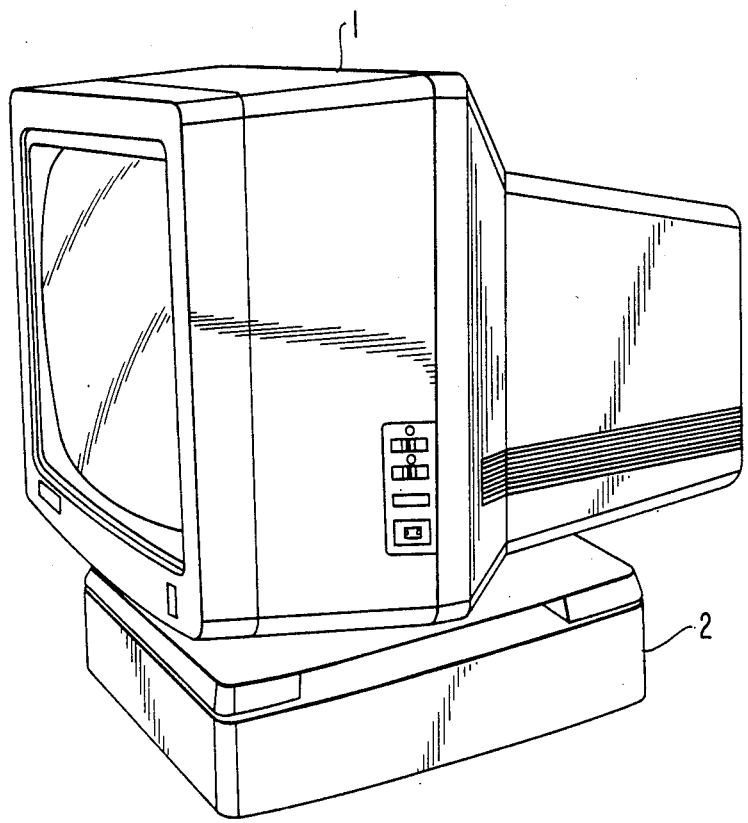
FIG. 1 shows a terminal mounted atop the housing for a functional control unit of the present invention.

FIG. 1 shows a terminal 1 and the housing 2 for the functional control unit. The functional control unit housing receives the electronics chassis through an opening in the housing facing the back side of terminal 1 (not shown). Housing 2 supports the terminal 1 to form a pedestal-type workstation.

Figure 2:
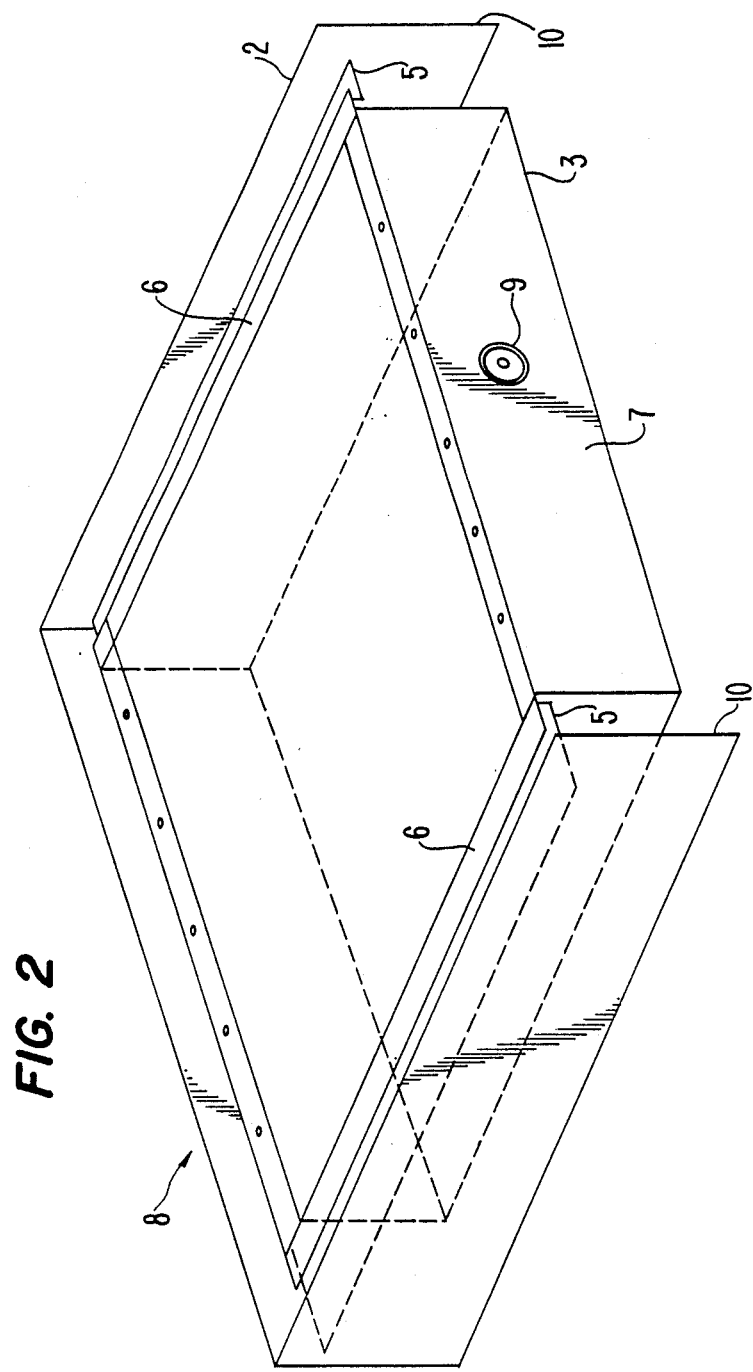
FIG. 2 shows the mounting of the electronics chassis in the functional control unit shown in FIG. 1.

FIG. 2 shows the mounting of the electronics chassis within the functional control unit housing 2. For simplicity of illustration, the top of housing 2 is not shown. Guide rail 5 is fixedly mounted to housing 2. Electronics chassis 3 comprises a suspension rail 6 that is bolted to the top of electronics chassis 3 for suspending the electronics. Suspension rail 6 is positioned atop guide rail 5 so as to suspend electronics chassis 3 within housing 2. Guide rail 5 and suspension rail 6 cooperate so that the electronics chassis 3 is slidably mounted within housing 2. The electronics chassis is removed by sliding it out the back side 10 of housing 2.

Backside 7 of the electronics chassis 3 comprises connections, not shown on FIG. 2, at least one connection 9 for connecting to the terminal and to various peripheral units. Front side 8 of housing 2 preferably comprises one or more apertures for an on/off switch and status indication displays.

Housing 2 preferably comprises ventilation apertures, not shown, for promoting the circulation of air about electronics chassis 3. The suspension of electronics chassis 3 within housing 2 may also promote the circulation of air about the electronics since heat may dissapate from the bottom of the box. The ventilation apertures and resulting air circulation maintain thermal equilibrium within the functional control unit. The design of appropriate ventilation apertures is within the level of skill of one of ordinary skill in the art and will therefore not be described further.

The weight of the electronics chassis is substantially less than the maximum weight that one service technician can lift. The testing, repair and replacement of the electronics chassis therefore requires only one service technician. The removable electronics chassis also simplifies the assembly of the functional control unit.

The principles, preferred embodiment and mode of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the spirit of the invention. Accordingly, the foregoing detailed description should be considered exemplary in nature and not as limiting to the scope and spirit of the invention set forth in the appended claims.

What is claimed is:

1. A mounting for electronic components of a function control unit of a pedestal-type work station, comprising:
   a self-contained electronics chassis holding the electronic components of the function control unit, the electronics chassis having a rear side and at least one connector on the rear side connecting the electronics chassis to portions of the pedestal-type workstation said chassis rear side being the only side having an electrical connector mounted thereon;
   a housing enclosing the electronics chassis, the housing also comprising a part of the pedestal-type workstation, the housing having a closed front, and an open rear side receiving the electronic chassis and an inside the housing having no electrical connector mounted thereon;
   a high resolution color graphics display terminal supported by the housing, the display terminal comprising part of the pedestal-type workstation; and
   means for removably mounting the electronics chassis inside the housing, the electronics chassis being electronically insulated from the inside of the housing.

2. A mounting for electronic components of a functional control unit as claimed in claim 6, wherein the removable mounting means mounting the electronics chassis comprises means for slidably suspending the electronics chassis in said housing.

3. A mounting for electronic components of a functional control unit as claimed in claim 2, wherein the suspension means comprises:
   guide rails fixedly attached to the housing; and
   suspension rails fixedly attached to the electronics chassis for cooperating with the guide rails and suspending the electronics chassis in the housing, the suspension rails being positioned over the guide rails.

* * * * *